Nov. 9, 1937.  J. F. BANNON ET AL  2,098,736
AUTOMATIC BRAKE CONTROL
Filed Oct. 16, 1934  4 Sheets-Sheet 1
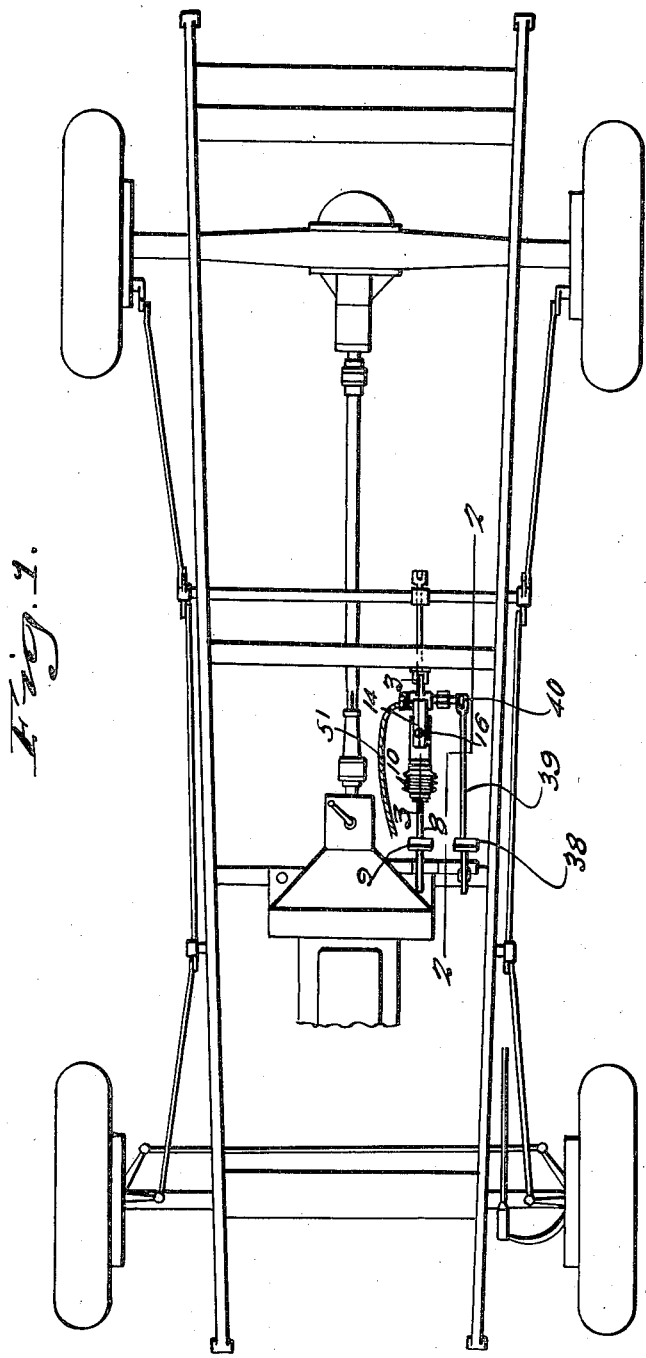
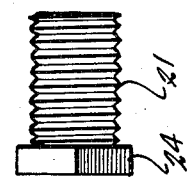
Inventor
Joseph F. Bannon
Clarence W. Bigler
By *Clarence A. O'Brien*
Attorney

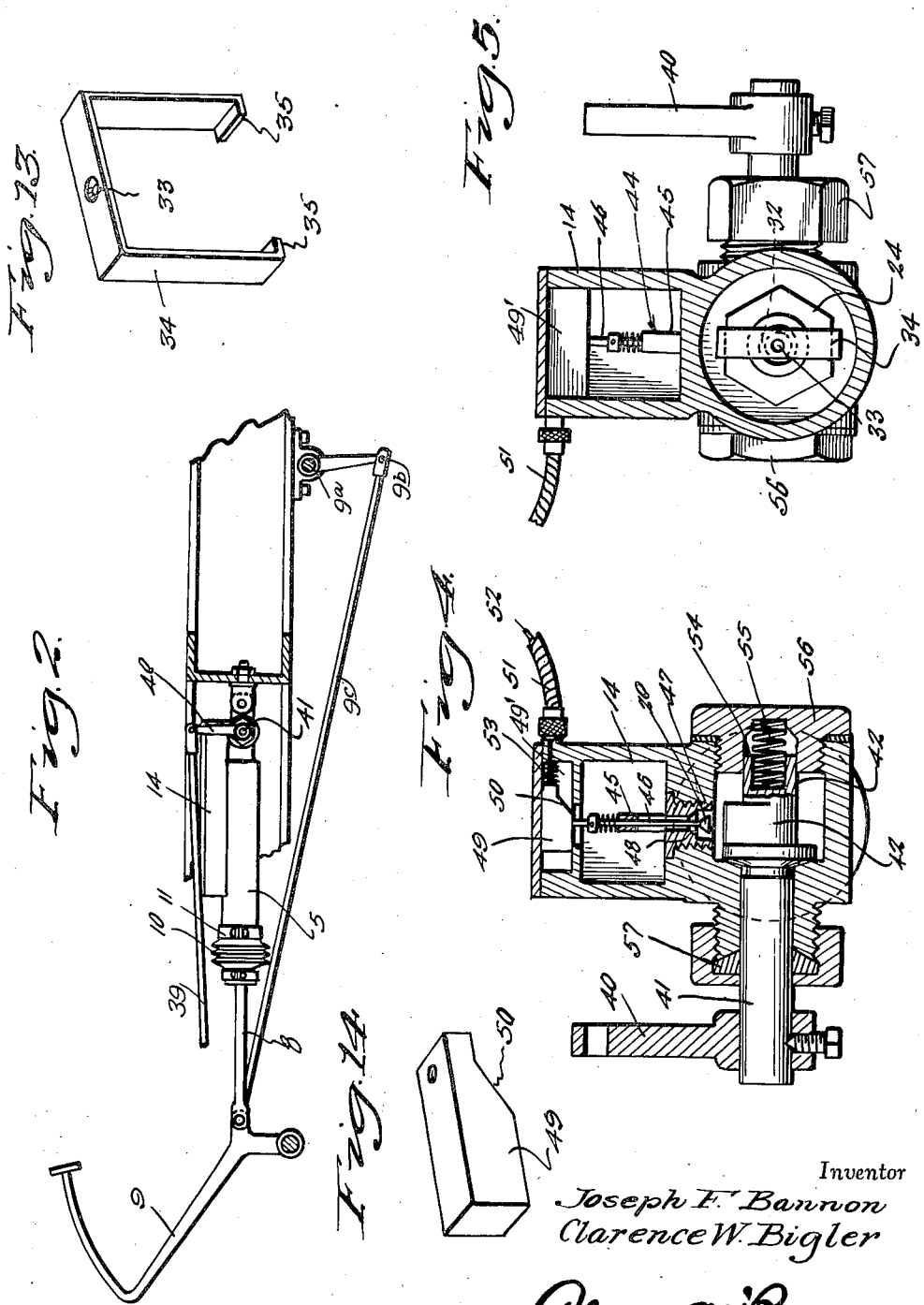

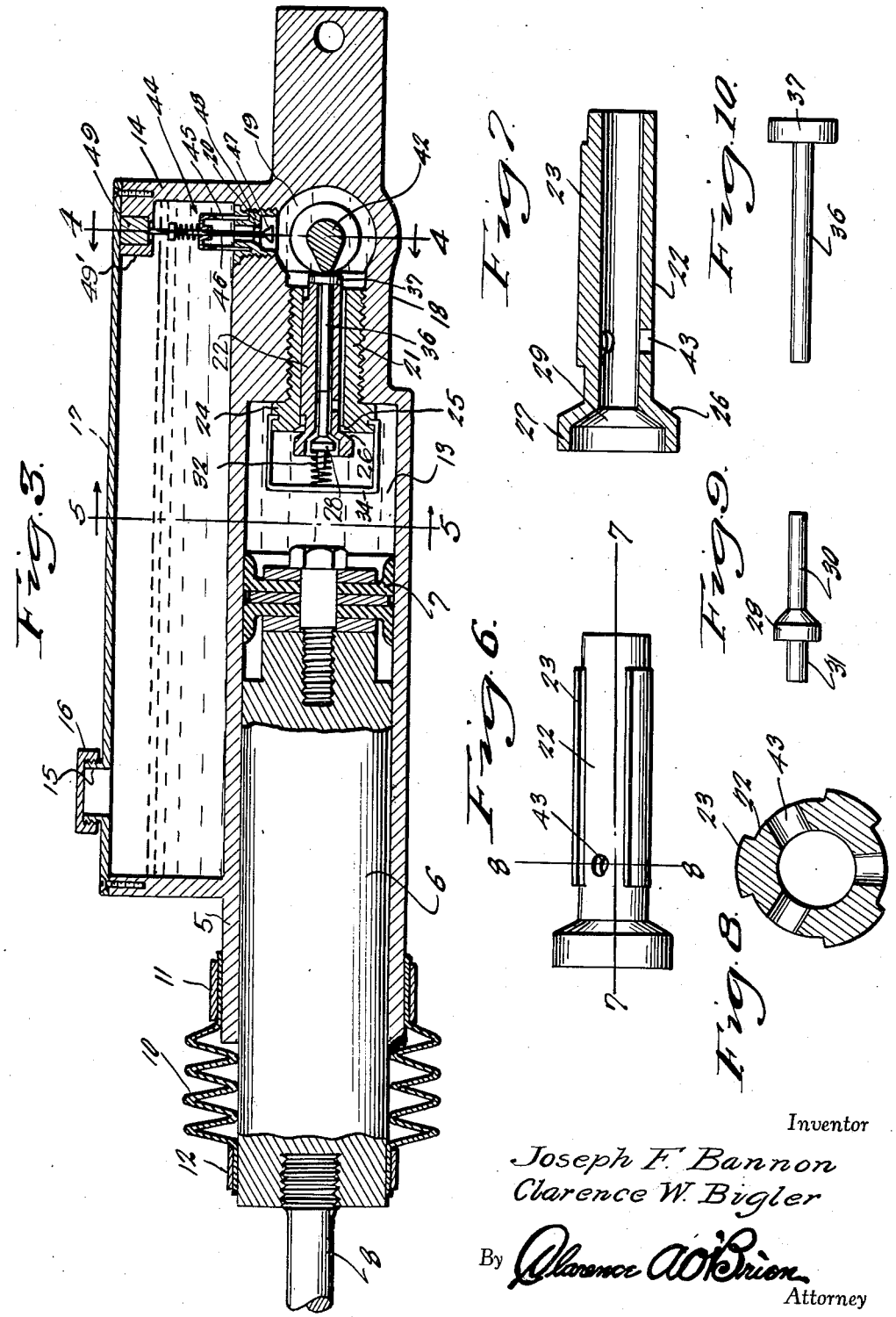

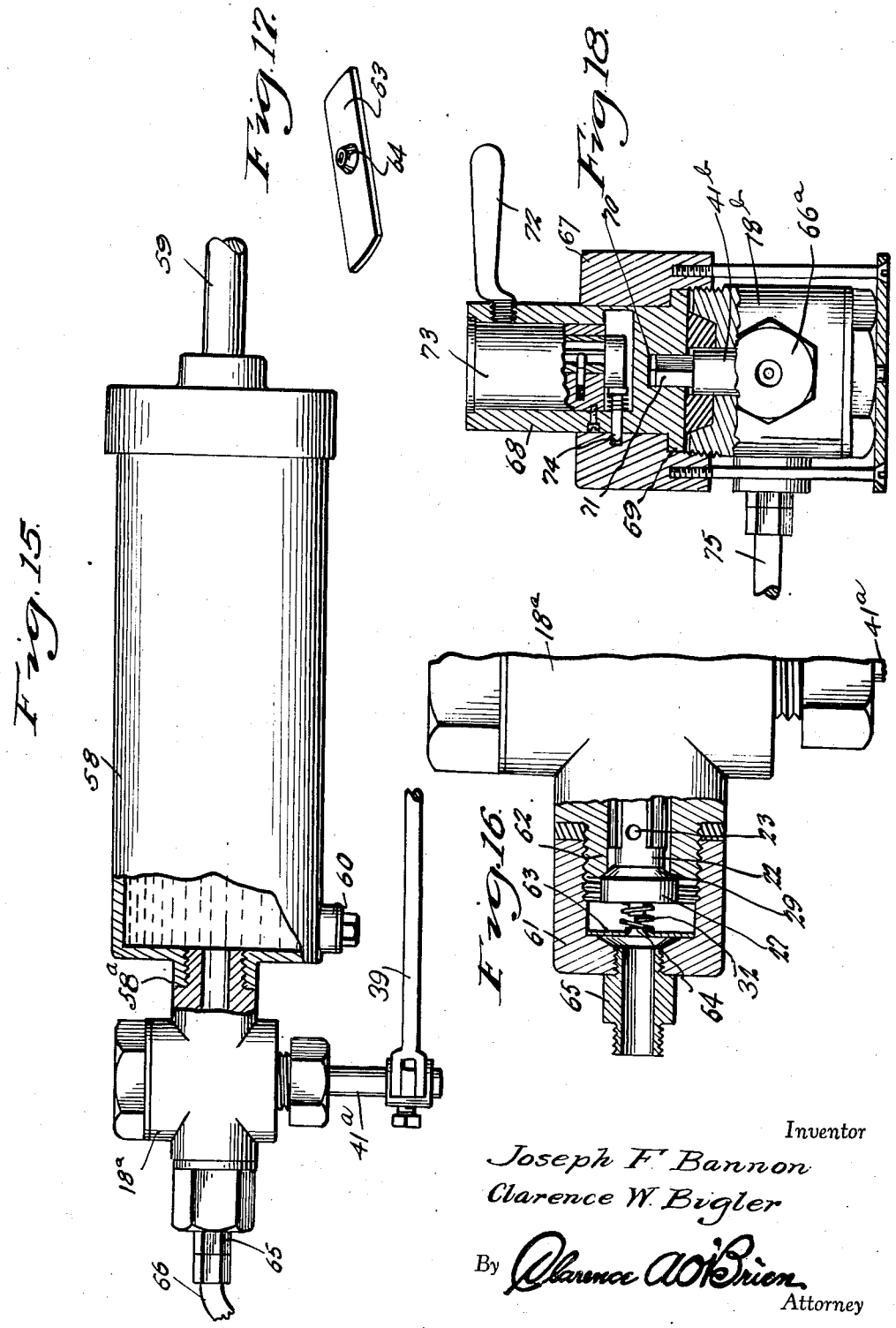

Patented Nov. 9, 1937

2,098,736

UNITED STATES PATENT OFFICE 2,098,736

AUTOMATIC BRAKE CONTROL

Joseph F. Bannon and Clarence W. Bigler, Crafton, Pa.

Application October 16, 1934, Serial No. 748,524

12 Claims. (Cl. 192—13)

This invention relates to vehicle brake controlling mechanism and has particular reference to brake controlling mechanisms for automobiles and similar vehicles.

The primary object of the present invention is to provide a mechanism fo. holding the vehicle from rolling on an incline after it has been brought to a stop, by maintaining the brakes in applied position without effort on the part of the driver, but which will be automatically released upon engaging the vehicle clutch to start the vehicle.

Another object is to provide a mechanism of this character which may be used equally well on vehicles having either the hydraulic or mechanical system of brakes.

Another object is to provide a fluid actuated check valve for holding the brakes in applied position, and a cam actuated release for tripping the check valve and releasing the brakes.

A further object is to provide a mechanism of this character which shall include a check valve comprising a main valve and a smaller auxiliary valve, and a cam actuated releasing means arranged to first open the small auxiliary valve to partially release the fluid under pressure, and then open the main valve and completely relieve the pressure of the fluid that held the brakes in applied position. In this manner, the operation of the device is accomplished with little effort and without strain on the parts and in a smooth and easy manner.

A further object is to provide a brake controlling mechanism which shall include means for locking the brakes in applied position to thereby prevent unauthorized use of the vehicle.

A still further object is to provide a mechanism of the aforesaid character which shall be simple in construction, inexpensive to manufacture, and which may be readily applied to existing cars having either a hydraulic or a mechanical brake system.

With the foregoing and other objects in view, the invention may be stated to consist in the various novel features of construction and arrangement or combination, all of which will be fully described hereinafter and pointed out in the appended claims.

In the drawings:

Figure 1 represents a top plan view of the chassis of an automobile showing the improved subject matter installed.

Figure 2 represents a fragmentary enlarged vertical sectional view taken substantially on the line 2—2 of Figure 1.

Figure 3 represents an enlarged longitudinal sectional view taken substantially on the line 3—3 of Figure 1.

Figure 4 represents a cross sectional view taken substantially on the line 4—4 of Figure 3.

Figure 5 represents a cross sectional view taken substantially on the line 5—5 of Figure 3.

Figure 6 represents a side elevational view of the control valve.

Figure 7 represents a longitudinal sectional view taken substantially on line 7—7 of Figure 6.

Figure 8 represents a cross sectional view taken substantially on the line 8—8 of Figure 6.

Figure 9 represents a side elevational view of the inner valve of the control valve.

Figure 10 represents the actuator of the inner valve.

Figure 11 represents a side elevational view of the external sleeve for containing the control valve.

Figure 12 represents a side elevational view of the clutch pedal operated cam.

Figure 13 represents a perspective view of the spring supporting frame as shown clearly in Figure 3.

Figure 14 represents a perspective view of the locking valve cam.

Figure 15 represents a side elevational view with parts broken away showing the master cylinder of the hydraulic brakes 1 in conjunction with the control valve.

Figure 16 represents an enlarged fragmentary detailed sectional view of the valve used in conjunction with the master cylinder shown in Figure 15.

Figure 17 represents a perspective view of the spring supporting cross member shown in Figure 16.

Figure 18 represents a vertical sectional view through a slightly modified form of direct hand control.

Referring to the drawings wherein like numerals designate like parts, it can be seen in Figure 3 wherein we have shown our device as used in connection with a vehicle having a mechanical system of brakes, that numeral 5 represents an elongated cylinder having the elongated plunger 6 snugly slidable therein, this plunger 6 is provided with a packing head 7 of suitable design and construction. Numeral 8 represents a rod which connects to the outer end of the plunger 6 and this rod extends to connect to the usual brake pedal 9 (see Figure 1). Figure 2 shows the usual cross shaft 9a of a conventional mechanical brake system which is provided with an arm 9b connected by the rod 9c to the brake pedal 9. A closure for the outer end of the cylinder 6 consists of a bellowlike sleeve 10 having one end secured over the adjacent end of the cylinder 5 by clamp band 11, while a similar clamp band 12 secures the opposite end to the plunger 6.

Numeral 13 represents the fluid receiving chamber of the cylinder 5 while numeral 14 represents a reservoir mounted on the cylinder 5 having a filler neck 15 and cap 16. It is preferable that the side walls of the reservoir be cast with the cylinder 5 and that the cap 17 be in the form of a removable plate. The cylinder 5 has a block-like extension 18 in which is located a pocket 19 communicated by a threaded opening with the reservoir 14. In this opening is located a bushing 20.

The block 18 has a threaded opening therein communicating the pocket 19 with the chamber 13 and in this is located an externally threaded sleeve 21, through which the valve barrel 22 is slidable. This valve barrel 22 is provided with longitudinally extending ribs 23 to keep certain longitudinal portions of the barrel spaced from the inside of the sleeve 21. As can be seen in Figure 3, the sleeve 21 is provided with a head 24 which abuts the end wall of the cylinder 5 as shown in Figure 3 and in this head is located the valve seat 25 with which the bevelled portion 26 acting as a valve on the head 27 of the barrel 22 acts so as to shut off any passage of fluid from the chamber 13 to the pocket 19.

The head 27 is cylindrical and receives an auxiliary valve element 28 which is cooperative with the internal seat 29 of the head 27. The auxiliary valve element 28 is provided with a shank 30 projecting loosely into the valve 22 the same having a projection 31 extending outwardly to engage into end convolutions of the compressible spring 32, which spring bears over a burr 33 punched from the intermediate portion of the U-shaped frame 34. The leg portions of the frame are provided with internal lugs 35—35 for engagement into recesses in the perimeter of the sleeve head 24.

An actuator for auxiliary valve 28 and the main valve 26 consists of a pin 36 loosely slidable in the barrel 22 and provided with a head 37 at its end terminating in the pocket 19.

For operating the control valve, it can be seen that the clutch pedal 38 (see Figure 1) has a rod 39 extending therefrom which pivotally connects to the arm 40 on the outer end of the cam shaft 41, this cam shaft 41 being provided with a cam 42 operating in the pocket 19 (see Figure 3). Obviously, when the clutch pedal 38 is in normal position with the clutch engaged, the cam 42 is assuming the position shown in Figure 3, maintaining the valves 26 and 28 in open position. At this point it can be observed that the valve shell 22 is provided with small openings 43 which communicate the channels formed between the rib 23 on the shell 22 with the interior of the shell and also with the fluid receiving chamber 13 of the cylinder 4 when the cam 42 is in the position shown in Figure 3.

Numeral 44 generally refers to a lock valve. The lock valve involves a guide 45 supported by the bushing 20 and through which the valve stem 46 is slidable. This stem 46 is provided with the valve element 47 cooperative with a seat 48 formed on bushing 20 and has one end impinging against the cam slide 49. This slide 49 is operative in the guide structure 49' and as is shown in Figure 4, the slide 49 is provided with the cam surface 50.

An armored conduit 51 extends from the reservoir 14 and has the wire 52 extending therefrom to a suitable control on the instrument board adjacent the driver's seat. This wire 52 extends into the reservoir 14 and connects to the aforementioned cam slide 49. A spring 53 is interposed between the cam slide 49 and one inner side of the reservoir 14 so as to maintain the slide urged toward the left in Figure 4. During normal operation of this mechanism, the wire 52 is held against the tension of the spring 53 by some suitable detent located adjacent the driver's seat (not shown). When the detent is actuated to release the wire 52, the slide 49 is moved to the left in Figure 4, bringing the bevel 50 of the slide over the upper end of the valve stem 46, so that the spring on the stem 46 elevates the stem and the valve element 47 is seated, thus closing off the reservoir 17 from the pocket 19. Therefore, when the plunger 6 is moved to the left in Figure 3, as when the brakes are being applied, fluid will be sucked into the cylinder 5 and pocket 19 past the valve 47, but the fluid cannot return, as the valve 47 will serve as a check. It follows, that if the block is employed with the detent at the driver's end of the wire 52, so that the lock 49 can be locked in the position stated, unauthorized use of the vehicle will be prevented.

By referring to Figure 4, it can be seen that the shaft 41 has its inner end recessed as at 54 and a spring 55 is seated within this recess and impinges against the inner side of the nut 56. (See Figure 4.) A packing gland 57 has the shaft 41 journalled therethrough.

Thus it can be seen, that when the brake pedal 9 is actuated to brake engaged position, the piston 7 is moved toward the left in Figure 3, filling the cylinder with fluid from the reservoir 17 by way of the valve 47. If the vehicle is to be brought to a stop, the clutch pedal 38 will be actuated and this will result in the actuation of the cam 42, releasing the cam 42 from the valve stem head 37, so that fluid in the cylinder 5 cannot return to the reservoir 14. With the parts in this position and with the brake mechanism secured, the driver's right foot can be utilized for accelerating the motor.

Upon release of the clutch pedal 38, the cam 42 will move against the stem head 37, first opening the small auxiliary valve element 28 and subsequently the main valve element 26. The purpose in first actuating the valve element 28 is so as to initially reduce the pressure in the cylinder 5 so that the larger valve 26 can subsequently open.

Figure 15 shows a modification of the invention as used on a vehicle having a hydraulic brake system and wherein the usual master cylinder of a hydraulic brake system is employed and this is denoted by numeral 58. Numeral 59 represents the usual brake plunger rod. The cylinder 58 has the usual filler neck and the outlet 60, the latter being plugged when the cylinder is used with the present invention as shown in Figure 15. In this form of the invention, the shaft 41a extends into the body 18a and operates on the valves 26 and 28 in the same manner aforedescribed. A cap 61 is threaded over the reduced portion 62 of the body and has a cross member 63 therein provided with a punched through burr 64 over which one end of the spring 32 of the valve assembly engages. The interior of the body 18a communicates with the cylinder 58 by way of the connection 58a. A connector 65 connects the fluid conduit 66 to the hydraulic brakes (not shown).

While the construction of the valve in this form is the same as in the form shown in Figure 3, the operation is somewhat different. It can be seen that when the brake is actuated and the rod 59 in Figure 15 moved toward the left, the fluid is placed under pressure. In this treatment of the fluid to effect a braking action, the valve 27 is in open position, and as soon as the valve 39 is actuated by foot pressure on the clutch pedal, the valve is closed and held closed, until the clutch pedal is released.

Figure 18 shows a device which can be employed independently of the clutch pedal and is intended solely as a means for locking the car to prevent stealing.

The device shown in Figure 18 is used in connection with fluid brakes. Numeral 67 is a body through which the shell 68 is journalled, this shell being provided with a head 69 having a polygonal socket 70 thereon for receiving the polygonal shaped end portion 71 of the shaft 41b corresponding to the shaft 41 shown in Figure 4. Obviously, instead of operating the shaft 41b through the use of the clutch pedal, the same is actuated in this instance manually by grasping the handle 72 on the shell 68.

The shell 68 contains the key lock mechanism 73 which controls the bolt 74 and is adapted to lock the shell to the body 67.

When it is desired to lock the vehicle this lock is employed, the lock mechanism 73 is operated to release the shell 69 so as to permit rotation thereof by the handle 72, thus rotating the shaft 41b so as to remove the cam 42 thereon (not shown in Figure 18), from the head 37 of the valve operating stem 36, so that the spring 32 employed in conjunction with the valve elements and explained before will permit fluid to pass in the fluid system toward the brakes (not shown) but which will not permit the fluid to return until the shell 68 is unlocked and rotated to cause valve actuation by the cam on the shaft 41b. In connection with this form of the invention numeral 75 represents the fluid inlet to the body 18b which is controlled through the body by the valve assembly while numeral 66a represents the outlet to the brakes (not shown).

While the foregoing specification sets forth the invention in specific terms, it is to be understood that numerous changes in the shape, size and materials may be resorted to without departing from the spirit or scope of the invention as claimed hereinafter.

Having thus described our invention, what we claim as new is:

1. In combination, a brake mechanism including a control member having a brake connection, a clutch pedal, a fluid reservoir, a cylinder including a piston therein connected to said control member, said cylinder communicating with said reservoir, and valve means for shutting off communication between said reservoir and the cylinder when the clutch pedal is operated to clutch disengaged position, said cylinder and reservoir being of unitary construction, said valve means consisting of the provision of a bore in one end of the cylinder, a tubular valvular slide provided with a valve head at one end engageable against the cylinder at one end of the said bore, said valvular member being open across its entire length and provided with ribs extending longitudinally on its outer side terminating inwardly of the said head, to define fluid passageways between the said valvular member and the wall of the bore, said valve head being provided with a seat therein, a spring-projected-to-closed-position valve in the said valve head, said spring-projected valve being provided with a stem extending through the valvular member, and a cam engaged with the free end of the stem and being operatively connected with the said clutch pedal.

2. In combination, a brake mechanism including a control member having a brake connection, a clutch pedal, a fluid reservoir, a cylinder including a piston therein connected to said control member, said cylinder communicating with said reservoir, and valve means for shutting off communication between said reservoir and the cylinder when the clutch pedal is operated to clutch disengaged position, said cylinder and reservoir being of unitary construction, said valve means consisting of the provision of a bore in one end of the cylinder, a tubular valvular slide provided with a valve head at one end engageable against the cylinder at one end of the said bore, said valvular member being open across its entire length and provided with ribs extending longitudinally on its outer side terminating inwardly of the said head, to define fluid passageways between the said valvular member and the wall of the bore, said valve head being provided with a seat therein, a spring-projected-to-closed-position valve in the said valve head, said spring-projected valve being provided with a stem extending through the valvular member, and a cam engaged with the free end of the stem and being operatively connected with the said clutch pedal, said stem being in a pair of sections, one section being connected to the spring-projected valve and the other being free in the valvular member to be engaged by the said cam.

3. In an apparatus for controlling the brakes of an automobile or similar vehicle, a housing having a fluid chamber and inlet and outlet openings communicating with said chamber, valve means within said housing adapted to permit the flow of fluid through said openings and chamber in one direction and prevent the flow of fluid in an opposite direction, means connected with the brake system of the vehicle for moving said fluid in a direction past said valve means when the vehicle brakes are applied thereby to maintain the brakes in applied position, a shaft within said housing and projecting through a wall thereof to the exterior of said housing, a cam actuated by said shaft and operatively connected to said valve means whereby movement of said shaft will actuate said cam to unseat said valve means and permit a free flow of fluid through said passages and chamber in either direction, and means for moving said shaft to actuate said cam whereby said valve means is unseated to release the vehicle brakes.

4. In an apparatus for controlling the brakes of an automobile or similar vehicle, a housing having a fluid chamber and an inlet and an outlet opening communicating with said chamber, valve means within said housing adapted to permit the flow of fluid through said openings and chamber in one direction and prevent the flow of fluid in an opposite direction, means connected with the brake system of the vehicle for moving said fluid in a direction past said valve means when the vehicle brakes are applied thereby to maintain the brakes in applied position, a shaft within said housing and projecting through a wall thereof to the exterior of said housing, a cam actuated by said shaft and operatively connected to said valve means whereby movement of said shaft will actuate said cam to unseat said valve means and permit a free flow of fluid through said passages and chamber in either direction, and a linkage connection between said shaft and the clutch actuating means of the vehicle whereby when the clutch is moved to engaging position, said valve is unseated to release the vehicle brakes.

5. In an apparatus for controlling the brakes of an automobile or similar vehicle, a housing having a fluid chamber and inlet and outlet openings communicating with said chamber, valve means within said housing comprising a main and an auxiliary valve adapted to permit the flow of fluid through said openings and chamber in one direction and prevent the flow of fluid in an opposite direction, means connected with the brake system of the vehicle for moving said fluid in a direction past said valves when the vehicle brakes are applied thereby to maintain the brakes in applied position, cam means within said housing operatively connected with said valves, said cam means having an operating member projecting through said housing and adapted upon movement to actuate said cam and unseat at least one of said valves against the pressure of the fluid and thereby permit a flow of fluid in a direction to release said brakes, and means for actuating said operating member.

6. In an apparatus for controlling the brakes of an automobile or similar vehicle, a housing having a fluid chamber and inlet and outlet openings communicating with said chamber, valve means within said housing comprising a main and an auxiliary valve adapted to permit the flow of fluid through said openings and chamber in one direction and prevent the flow of fluid in an opposite direction, means connected with the brake system of the vehicle for moving said fluid in a direction past said valves when the vehicle brakes are applied thereby to maintain the brakes in applied position, cam means within said housing operatively connected with said valves, said cam means having a shaft projecting through said housing and adapted upon movement to actuate said cam and first unseat said auxiliary valve to relieve the pressure of said fluid and then unseat said main valve and thereby permit a flow of fluid in a direction to release said brakes, and a linkage connection between said shaft and a manually operable member accessible to the driver.

7. In an apparatus for controlling the brakes of an automobile or similar vehicle, a housing having a fluid chamber and an inlet and an outlet opening communicating with said chamber, valve means within said housing adapted to permit the flow of fluid through said openings and chamber in one direction and prevent the flow of fluid in an opposite direction, means connected with the brake system of the vehicle for moving said fluid in a direction past said valve means when the vehicle brakes are applied thereby to maintain the brakes in applied position, a shaft within said housing and projecting through a wall thereof to the exterior of said housing, a cam actuated by said shaft and operatively connected to said valve means whereby movement of said shaft will actuate said cam to unseat said valve means and permit a free flow of fluid through said passages and chamber in either direction, a linkage connection between said shaft and the clutch actuating means of the vehicle whereby when the clutch is moved to engaging position, said valve is unseated to release the vehicle brakes, and manually controlled means for locking said brakes in applied position.

8. In an apparatus for controlling the brakes of an automobile or similar vehicle, a housing having a fluid chamber and inlet and outlet openings communicating with said chamber, valve means within said housing comprising a main and an auxiliary valve adapted to permit the flow of fluid through said openings and chamber in one direction and prevent the flow of fluid in an opposite direction, means connected with the brake system of the vehicle for moving said fluid in a direction past said valves when the vehicle brakes are applied thereby to maintain the brakes in applied position, and means within said housing and manually operable by the driver for first unseating said auxiliary valve and then unseating said main valve.

9. In an apparatus for controlling the brakes of an automobile or similar vehicle, a housing having a fluid chamber and inlet and outlet openings communicating with said chamber, valve means within said housing comprising a main and an auxiliary valve adapted to permit the flow of fluid through said openings and chamber in one direction and prevent the flow of fluid in an opposite direction, means connected with the brake system of the vehicle for moving said fluid in a direction past said valves when the vehicle brakes are applied thereby to maintain the brakes in applied position, a shaft journalled transversely of said housing and having one end projecting therethrough to the exterior of the housing, a cam portion carried by said shaft within said housing, means for rotating said shaft and cam, said cam being disposed in operative relation to said valves and adapted when rotated to unseat at least one of said valves against the pressure of the fluid and thereby permit a flow of fluid in a direction to release said brakes.

10. In an apparatus for controlling the brakes of an automobile or similar vehicle, a housing having a fluid chamber and an inlet and an outlet opening communicating with said chamber, valve means within said housing adapted to permit the flow of fluid through said openings and chamber in one direction and prevent the flow of fluid in an opposite direction, means connected with the brake system of the vehicle for moving said fluid in a direction past said valve means when the vehicle brakes are applied thereby to maintain the brakes in applied position, a cam within said housing and disposed in operative relation to said valve means, said cam upon movement being adapted to unseat said valve means and permit a free flow of fluid through said passages and chamber in either direction, and means exterior of the housing and operatively connected with said cam for actuating said valve means.

11. In an apparatus for controlling the brakes of an automobile or similar vehicle having a mechanical system of brakes, a housing having a fluid chamber and inlet and outlet openings communicating with said chamber, a fluid reservoir connected to one of said openings and a fluid pump member connected with the other opening, a check valve within said housing arranged to permit flow of fluid from said reservoir to said fluid pump member but normally preventing a flow of fluid in an opposite direction, means for connecting said fluid pump member to the vehicle brake system whereby application of the vehicle brakes will cause a flow of fluid from said reservoir past said check valve, and thereby maintain said brakes in applied position, a cam within said housing and disposed in operative relation to said check valve, said cam being adapted when actuated to unseat said valve means against the fluid pressure and thereby permit a flow of fluid back to said reservoir and release said brakes, and means exterior of the housing for actuating said cam.

12. In an apparatus for controlling the brakes of an automobile or similar vehicle having a mechanical system of brakes, a housing having a fluid chamber and an inlet and an outlet opening communicating with said chamber, a fluid reservoir connected to one of said openings and a fluid pump member connected with the other opening, a check valve structure within said housing arranged to permit a flow of fluid from said reservoir to said pump member but normally preventing a flow of fluid in an opposite direction, said check valve structure including a main valve and an auxiliary valve, means for connecting said fluid pump member to the vehicle braking system whereby application of the vehicle brakes will cause a flow of fluid from said reservoir past said check valve structure and thereby maintain said brakes in applied position, a cam within said housing and disposed in operative relation to said check valve, said cam being adapted when actuated to first unseat said auxiliary valve and then unseat said main valve and thereby permit a flow of fluid back to said reservoir and release said brakes, and means exterior of the housing for actuating said cam.

JOSEPH F. BANNON.
CLARENCE W. BIGLER.